United States Patent [19]

Takata et al.

[11] Patent Number: 5,266,197

[45] Date of Patent: Nov. 30, 1993

[54] HOLLOW FIBER MEMBRANE FOR BLOOD PURIFICATION

[75] Inventors: Jitsumi Takata; Isamu Yamamoto, both of Ootsu, Japan

[73] Assignee: Toyo Boseki Kabushiki Kaisha, Japan

[21] Appl. No.: 42,775

[22] Filed: Apr. 6, 1993

[30] Foreign Application Priority Data

Apr. 8, 1992 [JP] Japan .................................. 4-087149

[51] Int. Cl.⁵ ....................... B01D 69/08; B01D 71/64
[52] U.S. Cl. ............................ 210/500.23; 210/500.39
[58] Field of Search .................... 210/634, 644–646, 210/649–654, 321.62, 321.78–321.81, 321.88–321.9, 500.23, 500.37–500.39

[56] References Cited

U.S. PATENT DOCUMENTS 4,326,960  4/1982  Iwahori et al. .................... 210/243

*Primary Examiner*—Frank Sever
*Attorney, Agent, or Firm*—Wegner, Cantor, Mueller & Player

[57] ABSTRACT

A hollow fiber membrane suitable for blood purification is provided, which is durable to γ-ray sterilization and steam sterilization and is not deteriorated by the heat sterilization and which has an excellent capacity for dialysis. The membrane is made of a polyamidimide having a particular structure and has micropores having a mean pore radius of from 10 Å to 200 Å.

8 Claims, No Drawings

HOLLOW FIBER MEMBRANE FOR BLOOD PURIFICATION

The present invention relates to a hollow fiber membrane for blood purification, which is used as an artificial kidney.

As a material which has heretofore been used for a hollow fiber membrane, there are mentioned a regenerated cellulose described in, for example, Japanese Patent Kokai No. 50761/83 and a cellulose ester membrane as described in, for example, Japanese Patent Kokai No. 6916/79. However, it is known that a cellulosic membrane activates the complement system in blood and induces immune reactions and that a cellulose acetate shows also unsatisfactory for this biocompatibility. In addition, a cellulose ester has poor heat resistance and therefore has a drawback that it could not be subjected to steam sterilization It is often deteriorated also by $\gamma$-ray sterilization.

Polyamidimide membranes are disclosed in Japanese Patent Kokai Nos. 283705/88, 21931/90, 198619/90, 186328/91, etc. The techniques as disclosed in them are available a polyamidimide membrane to separate water and organic substances from an aqueous solution of organic substances by pervaporation, and no description relating to a membrane structure is given in them. In view of the purpose of the disclosed techniques, the pore radius of the membrane would be 10 Å or less, and the membranes disclosed in them could not be employed for blood purification.

Japanese Patent Kokai Nos. 123607/89, 245806/89 and 290230/90 have also disclosed polyamidimide membranes, all of which, however, are gas separation membranes. They do not disclose a technique of membrane for blood purification. The membranes as disclosed by them have a too small pore diameter and therefore could not be used for blood purification.

The present invention is to overcome the above-mentioned problems in the prior art and to provide a polyamidimide membrane for blood purification or a hollow fiber membrane for blood purification, which has a suitable water permeability and has a high urea permeability, which induces little complement activation and which is able to $\gamma$-ray sterilization and steam sterilization.

In order to overcome the above-mentioned problems, the present inventors earnestly studied and, as a result, have succeeded in obtaining a hollow fiber membrane for blood purification, which has good processability (melt spinnability, solution spinnability), which has excellent heat resistance and physical and chemical stability, which has a good balance of the water permeability and the urea permeability and which may be applied to $\gamma$-ray sterilization or heat sterilization such as steam sterilization, by using a polyamidimide resin having a particular structure.

Specifically, the present invention is a polyamidimide hollow fiber membrane for blood purification having polyamidimide structural units to be represented by the following general formula (1) or, precisely, a porous polyamidimide hollow fiber membrane for blood purification having an average pore radius from 10 Å to 200 Å.

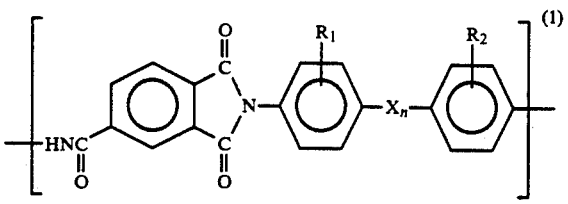

wherein $R_1$ and $R_2$ each represent a hydrogen atom and/or an alkyl group having from 1 to 4 carbon numbers; X represents a bonding group of O, CO, $SO_2$ or $CR_3.R_4$; $R_3$ and $R_4$ each represent a hydrogen atom or a methyl group; and n represents 0 or 1.

In particular, it is suitable that a hollow fiber membrane for blood purification having micropores having an average pore radius from 10 Å to 200 Å and containing polyamidimide units to be formed by reaction of an acid component, wherein that is containing or a trimellitic anhydride of the following formula (2) in an amount of 60 mol% or more to the whole acid component, and a diisocyanate component, wherein that is a diisocyanate compound of the following general formula (3) in an amount of 60 mol% or more to the whole diisocyanate component.

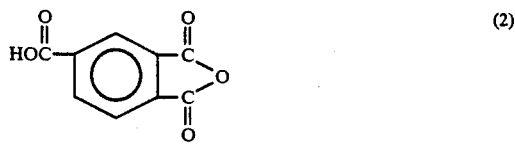

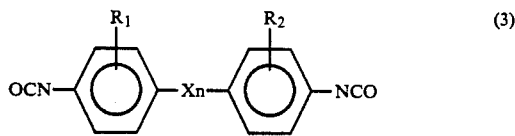

wherein $R_1$ and $R_2$ each represent a hydrogen atom and/or an alkyl group having from 1 to 4 carbon numbers; X represents a bonding group of O, CO, $SO_2$ or $CR_3.R_4$; $R_3$ and $R_4$ each represent a hydrogen atom or a methyl group; and n represents 0 or 1.

The acid component to be available in production to the polyamidimide resin of the general formula (1) by an isocyanate method consists essentially of a trimellitic anhydride of the formula (2). As the other acid components, there are, for example, acid anhydrides such as pyromellitic anhydride, 3,3',4,4'-biphenyltetracarboxylic acid anhydride, 3,3',4,4'-benzophenonetetracarboxylic acid anhydride, 3,3',4,4'-biphenylsulfonetetracarboxylic acid anhydride, and adipic acid, sebacic acid, maleic acid, fumaric acid, dimer acid, stilbenedicarboxylic acid and the like.

The isocyanate compound of the general formula (3) includes, for example, 3,3'-dimethyl 4,4'-diisocyanate biphenyl (3,3'-bitolylene-4,4'-diisocyanate), 4,4'-diphenylether diisocyanate, 4,4'-diphenylsulfone diisocyanate, 4,4'-diphenylmethane diisocyanate, 2,2'-di-p-phenylpropane diisocyanate and the like.

The reason for the molar ratio of the acid component or diisocyanate component of the formula (2) or the formula (3) of being 60 mol% or more is based on the characteristic with polymerizability, the solubility of the polymer in solvents and the properties of the membrane.

The preferred membrane material to achieve the above-mentioned objects of the present invention is a polyamidimide resin containing polyamidimide units to be represented by the following formula (4), which corresponds to the general formula (1) where $R_1$ and $R_2$ are methyl groups and n is 0 (zero), or by the following formula (5), which corresponds to the general formula (1) where $R_1$ and $R_2$ are hydrogen atoms, X is $CH_2$ and n is 1 (one).

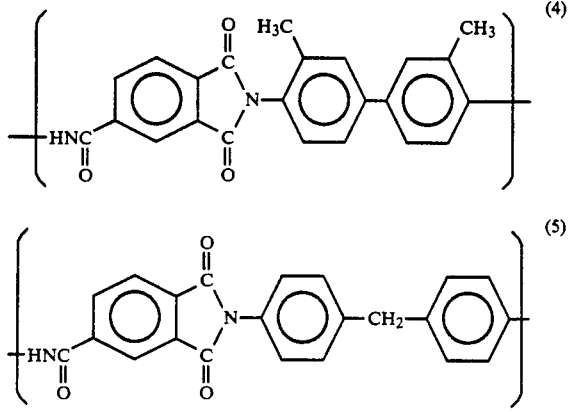

The content of these components being 60 mol% or more is the minimum amount necessary to achieve the superiority of the present invention with respect to the heat resistance, the high permeability and the physical and chemical stability of the hollow fiber membrane for blood purification. Specifically, if the content is less than 60 mol%, a hollow fiber membrane for blood purification could not be obtained, which has high permeability and has excellent durability to various membrane sterilization methods such as steam sterilization and other heat sterilization, γ-ray sterilization and other radiation sterilization, ethylene oxide gas sterilization, ultraviolet irradiation sterilization and the like. If desired, any other structural units except those of the general formula (1) may be introduced into the resin, in view of the melt spinnability and solution spinnability of the resin for processing it into hollow fibers.

The logarithmic viscosity of the polyamidimide of the present invention is from 0.5 to 3.5 dl/g, preferably from 1.0 to 2.0 dl/g, as measured in N-methyl-2-pyrrolidone at 30° C. The molecular weight of the polyamidimide of the present invention is preferably from 10000 to 80000, especially preferably from 20000 to 60000, as a mean molecular weight (Mn), in view of the spinnability of the resin into hollow fibers and of the mechanical strength of the membrane formed.

The preferred method of polymerizing the polyamidimide of the present invention is the above-mentioned isocyanate method. Alternatively, a method of using a diamine may also be available, in which the acid component comprises 60 mol% or more, to the whole acid component, of trimellitic anhydride chloride and optionally other acid component(s) selected from terephthalic acid, isophthalic acid, 4,4'-biphenyldicarboxylic acid, pyromellitic acid, 3,3',4,4'-biphenylsulfonetetracarboxylic acid, adipic acid, sebacic acid, maleic acid, fumaric acid, dimer acid and stilbenedicarboxylic acid.

The amine component to be available in this method comprises 60 mol% or more, to the whole amine component is selected from 4,4'-diaminodiphenylether, 4,4'-diaminodiphenylmethane, 4,4'-diaminodiphenylsulfone, 4,4'-diaminobenzophenone, 2,2'-bis(4-aminophenyl)propane and o-toluidine. It may contain other amine component(s) are selected from p-phenylenediamine, m-phenylenediamine, 2,4-tolylenediamine, 2,6-tolylenediamine, p-xylenediamine, m-xylenediamine, isophorone and/or hexamethylenediamine.

The hollow fiber membrane of the present invention is a homogeneous or asymmetric membrane, which thickness is from 5 to 100 μm, preferably from 10 to 80 μm, and average pore radius is from 10 Å to 200 Å, preferably from 20 Å to 100 Å and having a porosity of from 70 to 90%. The hollow fiber membrane as stated above may be produced by extruding a molten polyamidimide resin or a solution of the polyamidimide in an amide solvent optionally containing a polyalcohol from the outer peripheral portion of a tube-in-orifice spinning nozzle with extruding a gas or a non-coagulating or coagulating liquid in to the polymer liquid from centre of the spinning nozzle, followed by dipping the extruded polymer liquid in a coagulation bath directly or after the polymer liquid has been passed through a gaseous atmosphere. Then, a part or all of the solvent and additives are extracted from hollow fibers in water and optionally a pore keeping agent is added to the fibers, and the fibers are then dried.

The solvents available for spinning the polymer liquid of the present invention, mentioned are polar solvents such as dimethylformamide, dimethylacetamide, N-methyl-2-pyrrolidone, dimethylsulfoxide, dimethylurea and the like. Mixing with the polar solvent, some solvents are also usable are hydrocarbons such as toluene, xylene and the like; ketones such as acetone, methyl ethyl ketone, methyl isobutyl ketone, cyclohexanone and the like; ethers such as ethyl cellosolve, diethylene glycol dimethyl ether, dioxane and the like; and esters such as ethyl acetate, n-butyl acetate, γ-butyrolactone and the like.

The dope for spinning the polymer liquid of the present invention may contain, in addition to the above-mentioned solvent, at least one or more other solvents of polyalcohols, such as ethylene glycol, diethylene glycol, triethylene glycol, tetraethylene glycol, polyethylene glycol, glycerin and the like, or lower alkyl ether derivatives of them.

The hollow fiber membrane for blood purification to be produced by the above-mentioned method is used in the medical field for hemo dialysis, hemo-filtration, blood purification and the like.

In order to use the membrane of the present invention for blood purification, the membrane needs excellent resistance to γ-ray sterilization and steam sterilization, as mentioned above, and may effectively remove low molecular substances such as urea. However, the membrane is not desired to have a too high capacity of water permeability. In addition, also as mentioned above, the membrane's complement activation is necessary. In addition, the membrane is needed to have a sufficient mechanical strength for easy handling. The thickness of the membrane has an influence on the complement activation and strength of it; and the micropore radius of the membrane effects its capacity of dialysis. The porosity means the volume of the micropores in the membrane. The larger the porosity, the larger the amount of the micropores in the membrane. A membrane for blood purification is desired to have many micropores of from 10 Å to 200 Å, in view of the water permeability and the dialyzance.

Since the membrane of the present invention may be used for blood purification, it is important that the membrane has excellent water permeability in dialysis of blood. The capacity of water permeability of the membrane is represented by the ratio ($\alpha$ value) of the pure water permeability to water permeability in bovine blood and by a down ratio of the water permeability under in dialysis of bovine blood (C value, which is represented by a ratio (%) of the water permeability of the membrane after dialysis of bovine blood with it for 60 minutes to that after dialysis of the same with it for 15 minutes). The $\alpha$ value is necessary at least 0.1, preferably at least 0.2; and the C value needs 50% or more, preferably 70% or more.

EXAMPLE 1

192.1 g (1.0 mol) of trimellitic anhydride (TMA), 34.8 g (0.20 mol) of 2,4-tolylene diisocyanate (TDI), 211.4 g (0.80 mol) of bitolylene diisocyanate (TODI) and 2000 g of N-methyl-2-pyrrolidone were put in a reactor and were heated up to 200° C. over a period of about one hour, with stirring. Then, the content was stirred for about 5 hours at 200° C., and thereafter the reaction was stopped. The logarithmic viscosity of the thus obtained polymer was 1.56 dl/g, having a concentration of 0.5 g/dl in N-methyl-2-pyrrolidone. The mean molecular weight (Mn) of the polymer was 30000, as measured with an liquid chromatography LC/6A Model (manufactured by Simazu Co., Ltd.) under the condition mentioned below.

Condition for Measurement

Mobile layer: DMF/LiBr (0.1 wt.%).
Column: Shodex AD800P→AD804/S→AD803-S→AD802/S.
Flow rate: 1 ml/min.
Temperature: 50° C.
Sample: Acetone-reprecipitated and washed sample.

To the polymer solution thus obtained, added was 250 g of tetraethylene glycol. This was stirred for 2 hours at 100° C. to obtain a homogeneous polymer solution as a dope for forming membrane. Using this dope and a tube-in-orifice spinnerette, a hollow fiber membrane was formed in the manner mentioned below. Precisely, the dope was extruded out through the outer peripheral space of the spinning nozzle with extruding air out through the inner core of the same, the extruded dope was passed through a gaseous atmosphere for about 0.01 second and then introduced into an aqueous solution containing N-methyl-2-pyrrolidone and tetraethylene glycol and having an ability of coagulating the dope, in which the extruded dope was solidified. Thereafter the solvent and the additives were washed out from the hollow fiber in water. Then, the hollow fiber was dipped in an aqueous 50% glycerin solution under 70° C. for 5 seconds and thereafter dried at 95° C. to be a homogeneous hollow fiber membrane having an outer diameter of 237 $\mu$m and a thickness of 18.5 $\mu$m.

Polyamidimide hollow fibers thus obtained or hollow fibers as treated by $\gamma$-ray irradiation or steaming were bundled into 120 fibers, and the both ends of the fiber bundle having a length of about 20 cm were solidified and bonded together with an epoxy resin with the openings of each hollow fiber being exposed. The bundle was cut leaving a part of the resin with it. The thus obtained hollow fiber bundle sample for evaluation was fully washed with a pure water, and a pure water of 37° C. was flown into inside of the hollow fibers under the pressure of 150 mmHg, whereupon the water permeation rate (UFR) was measured. The results obtained are shown in Table 1 below. A bundle of 800 hollow fibers was also solidified with an epoxy resin in the same manner as above and cut to give a sample for measurement of the solute permeability. The units of the properties shown in Table 1 are as follows:

PUN: cm/sec.
Strength: kg/mm2.
Elongation: %.

Using the sample, the solute permeability of urea (PUN) was measured by the method of Klein et al under the condition mentioned below. The results obtained are shown in Table 1.

Condition for Measurement

Solute solution: Solution of 5 g of urea dissolved in one liter of pure water Feeding rate (Qb): 17 ml/min
Dialysate: Pure water of 37° C. Feeding rate (Qd): 1200 ml/min The solute permeability (P) is defined by the following equation:

$$P = Qb \times \ln(C_2/C_2)/A$$

where
Qb is the flow rate of the solute solution (ml/min);
A is the membrane area (cm2);
C1 is the solute concentration at the inlet (g/liter); and
C2 is the solute concentration at the outlet (g/liter).

The average pore radius was obtained in accordance with the following equation of a modified Hagen-Poiseulle, using the water permeation rate (UFR) and the porosity.

$$r = \sqrt{\frac{8 \times \eta \times L \times UFR \times K}{\epsilon}}$$

wherein
r is the average pore radius (A); $\eta$ is the viscosity of pure water at 37° C.;
L is the thickness of the membrane ($\mu$m);
UFR is the permeation rate of pure water (ml/m$^2$.hr.mmHg); and
$\epsilon$ is the porosity of the membrane (%).
K is the conversion constant of units (K=2080)

Evaluation of the complement activation of the hollow fiber membrane was effected in accordance with the method of Mayer described in Experimental Immuno Chemistry p. 133 (1961).

Measurement of the porosity ($\epsilon$) was carried out as follows: A desired amount of the hollow fiber bundle was sampled and fully washed with a pure water. Then, this was treated with a centrifuger to remove the excess water from the surface of the sample. Next, the weight of the wet sample was measured rapidly before drying. This was dried at 105° C. for 3 hours, and the weight of the dry sample was measured. The porosity ($\epsilon$) was determined by the following equation.

$$\epsilon = 1 - \frac{\frac{Wd}{\rho}}{1 - \frac{Wd}{Ww} + \frac{Wd}{\rho}}$$

wherein
Ww is the weight of hollow fiber before drying (g);
Wd is the weight of hollow fiber after drying (g); and
$\rho$ is the specific gravity of the polymer.

EXAMPLE 2

192.1 g (1.0 mol) of trimellitic anhydride, 43.5 g (0.25 mol) of 2,4-tolylene diisocyanate, 198.2 g (0.75 mol) of bitolylene diisocyanate and 2000 g of N-methyl-2-pyrrolidone were charged to a reactor and heated up to 200° C. over a period of about one hour, under stirring. Then, the reactor solution was maintained for about 5 hours at 200° C., and thereafter the reaction was stopped. The logarithmic viscosity of the thus obtained polymer was 1.15 dl/g, having a concentration of 0.5 g/dl in N-methyl-2-pyrrolidone. The mean molecular weight (Mn) of the polymer was 24000.

To the polymer solution reactor solution, added was 250 g of polyethylene glycol having a molecular weight of 200 was added. This was stirred for 2 hours at 100° C. to obtain a homogeneous polymer solution as a dope for forming membrane. Using a tube-in-orifice spinning nozzle, a hollow fiber membrane was formed in the manner mentioned below. Precisely, the dope was extruded out through the outer peripheral space of the spinning nozzle with extruding liquid paraffin out through the inner core of the same, the extruded dope was passed through a atmosphere for about 0.06 second and then introduced into an aqueous solution containing N-methyl-2-pyrrolidone and polyethylene glycol (coagulating liquid), in which the extruded dope was coagulated. Thereafter the solvent and and additives were washed out from the fiber in water. Then, the fiber was dipped in an 40% glycerin aqueous solution of 70° C. for 5 seconds and thereafter dried at 95° C. to be a homogeneous hollow fiber membrane having an outer diameter of 230 μm, an inner diameter of 200 μm and a thickness of 15 μm.

The liquid paraffin in the inside of the polyamidimide hollow fiber was washed out with freon. The both ends of a bundle of the fibers were bonded and the bundle was cut with the openings of the fibers being exposed, in the same manner as in Example 1. The sample thus prepared was subjected to the same test as in Example 1 to measure the permeability of it before and after γ-ray irradiation and steaming treatment. The results obtained are shown in Table 1.

EXAMPLE 3

192.1 g (1.0 mol) of trimellitic anhydride, 87.5 g (0.35 mol) of diphenylmethane diisocyanate (MDI), 171.8 g (0.65 mol) of bitolylene diisocyanate and 2000 g of N-methyl-2-pyrrolidone were charged to a reactor and heated up to 200° C. over a period of about one hour, under stirring. Then, the content was stirred for about 5 hours at 200° C., and thereafter the reaction was stopped. The logarithmic viscosity of the obtained polymer was 0.98 dl/g, having a concentration of 0.5 g/dl in N-methyl-2-pyrrolidone. The mean molecular weight (Mn) of the polymer was 18000.

From the polymer solution, a dope for forming membrane was prepared in the same manner as in Example 2. Using the dope, a hollow fiber membrane was prepared also in the same manner as in Example 2. The membrane thus obtained was a homogeneous membrane having an outer diameter of 240 μm, an inner diameter of 205 μm and a thickness of 17.5 μm.

The polyamidimide membrane thus obtained was tested to measure the permeability of it before and after γ-ray irradiation and steaming treatment. The results obtained are shown in Table 1.

COMPARATIVE EXAMPLE 1

Polymerization was effected in the same manner as in Example 3, except that the amounts of diphenylmethane diisocyanate and bitolylene diisocyanate were changed to 125.0 g (0.50 mol) and 132.2 g (0.50 mol), respectively, to obtain a polymer solution having a logarithmic viscosity of 0.47 dl/g. The mean molecular weight (Mn) of the polymer was small and 9600. Using the polymer, a hollow fiber membrane was prepared in the same manner as in the previous examples. The membrane obtained had an outer diameter of 260 μm, an inner diameter of 215 μm and a thickness of 22.5 μm.

The membrane was tried to be subjected to the test for measuring the permeability, but the measurement was impossible since the strength of the membrane was weak and many fibers bent and broke in the resin bonded portion The strength of the membrane was shown in Table 1.

EXAMPLE 4

192.1 g (1.0 mol) of trimellitic anhydride and 250.0 g (1.0 mol) of diphenylmethane diisocyanate were charged to in a reactor, and 2000 g of N-methyl-2-pyrrolidone was added thereto. Under stirring, the content was heated up to 200° C. over a period of about one hour. Then, the content was stirred for about 5 hours at 200° C., and thereafter the reaction was stopped. The logarithmic viscosity of the obtained polymer was 0.96 dl/g, having a concentration of 0.5 g/dl in N-methyl-2-pyrrolidone. The mean molecular weight (Mn) of the polymer was 19000.

Using the polymer solution, a hollow fiber membrane was prepared in the same manner as in Example 2. The membrane thus obtained was a homogeneous membrane having an outer diameter of 242 μm, an inner diameter of 210 μm and a thickness of 16.0 μm.

The polyamidimide membrane thus obtained was tested to determine the membrane structure of it and to measure the permeability of it before and after γ-ray irradiation and steaming treatment. The results obtained are shown in Table 1.

REFERENCE EXAMPLE

A cellulose diacetate hollow fiber membrane was formed into a module for measurement of the complement activation, in the same manner as in Example 1. The degree of the complement activation was measured and shown in Table 1, as a comparison to the samples prepared above.

TABLE 1

| number | structure of hollow fiber | properties of membrane |
|---|---|---|
| average | membrane | after steaming |

TABLE 1-continued

| | ratio of composition | molecular weight of polymer | thickness (μm) | average pore radius (A) | porosity (%) | before treatment | | | treatment(*1) | | |
|---|---|---|---|---|---|---|---|---|---|---|---|
| | | | | | | UFR | PUN | strength/-elongation | UFR | PUN | strength/-elongation |
| Ex. 1 | TMA//-TODI/TDI 100//80/20 | 30000 | 18.5 | 25.8 | 80.5 | 25.0 | 112 | 4.88/37.8 | — | — | — |
| Ex. 2 | TMA//-TODI/TDI 100//75/25 | 24000 | 15.0 | 35.8 | 82.0 | 60.2 | 107 | 4.75/23.6 | 54.9 | 98 | 3.55/12.1 |
| Ex. 3 | TMA//-TODI/MDI 100//65/35 | 18000 | 17.5 | 29.6 | 75.2 | 32.5 | 98 | 2.74/20.3 | 42.3 | 90 | 2.20/11.8 |
| Ex. 4 | TMA//-MDI 100//100 | 19000 | 16.0 | 33.7 | 75.7 | 46.2 | 86 | 2.13/24.3 | 42.0 | 98 | 1.69/7.1 |
| Comp. Ex. 1 | TMA//-TODI/MDI 100//50/50 | 9600 | 22.5 | — | 85.3 | — | — | 1.13/5.8 | — | — | — |
| Ref. Ex. | CA | — | 15.2 | 12.9 | 65.0 | 6.1 | 95 | 5.84/60.2 | 0 | — | — |

| | properties of membrane after γ-ray irradiation(*2) | | | complement consumption (%) |
|---|---|---|---|---|
| | UFR | PUN | strength/-elongation | |
| Ex. 1 | 25.6 | 109 | 4.88/37.0 | 3 |
| Ex. 2 | 58.2 | 104 | 4.70/23.1 | 4 |
| Ex. 3 | 31.7 | 98 | 2.69/20.0 | 1 |
| Ex. 4 | 45.1 | 85 | 2.01/23.9 | 5 |
| Comp. Ex. 1 | — | — | — | 5 |
| Ref. Ex. | — | — | 2.00/16.8 | 27 |

(*1) Steaming treatment: 121° C. × 20 min
(*2) γ-ray irradiation: 50 KGy (5 mRd)

EXAMPLE 5

192.1 g (1.0 mol) of trimellitic anhydride, 26.1 g (0.15 mol) of 2,4-tolylene diisocyanate, 224.6 g (0.85 mol) of bitolylene diisocyanate and 2000 g of N-methyl-2-pyrrolidone were charged to a reactor and heated up to 200° C. under stirring. Then, these were reacted for 5 hours at 200° C., and thereafter the reaction was stopped. The logarithmic viscosity of the thus obtained polymer was 1.7 dl/g, having a concentration of 0.5 g/dl in N-methyl-2-pyrrolidone. The mean molecular weight (Mn) of the polymer was 41000, as measured in the same manner as in Example 1.

Using the polymer solution thus obtained, a hollow fiber membrane was prepared by the same method as in Example 1 where air was extruded out through the inside core of the tube-in-orifice spinning nozzle and the polymer solution was extruded out through the outer space of the same. Thus, a hollow fiber membrane having an outer diameter of 233 μm, an inner diameter of 199 μm and a thickness of 17 μm was obtained.

The polyamidimide hollow fiber membrane thus obtained was tested in the same manner as in Example 1 to measure the permeability of it before and after γ-ray irradiation and steaming treatment. The results obtained are shown in Table 2. Using the hollow fiber membrane before the treatment, the permeability of it blood was measured. The water permeation rate through the membrane with blood was 56% in 15 minutes after the start of the measurement, to that with a pure water. The depression of the water permeation rate through the membrane with blood was 8% in 60 minutes after the start of the measurement, and the water permeability retention of the membrane was high.

EXAMPLE 6

192.1 g (1.0 mol) of trimellitic anhydride, 17.4 g (0.1 mol) of 2,4-tolylene diisocyanate, 237.9 g (0.9 mol) of bitolylene diisocyanate and 2000 g of N-methyl-2-pyrrolidone were charged to a reactor and heated up to 200° C. under stirring. Then, these were reacted for 5 hours at 200° C., and thereafter the reaction was stopped. The logarithmic viscosity of the thus obtained polymer was 2.0 dl/g, having a concentration of 0.5 g/dl in N-methyl-2-pyrrolidone. The mean molecular weight (Mn) of the polymer was 59000, as measured in the same manner as in Example 1.

Using the polymer solution thus obtained, a hollow fiber membrane was prepared in the same manner as in Example 5, which had an outer diameter of 235 μm, an inner diameter of 201 μm and a thickness of 17 μm.

The polyamidimide hollow fiber membrane thus obtained was tested in the same manner as in Example 1 to measure the permeability of it before and after steaming treatment. The results obtained are shown in Table 2. Using the hollow fiber membrane before the treatment, the permeability of it with blood was measured The water permeation rate through the membrane with blood was 45% in 15 minutes after the start of the measurement, to that with a pure water. The depression of the water permeation rate through the membrane with blood was 9% in 60 minutes after the start of the measurement, and the water permeability retention of the membrane was high.

TABLE 2

| ratio of | number average molecular weight of | structure of hollow fiber membrane | | | properties of membrane | |
|---|---|---|---|---|---|---|
| | | thickness | average pore radius | porosity | before treatment | after steaming treatment(*1) |
| | | | | | strength/- | strength/- |

TABLE 2-continued

|   | composition | polymer | (μm) | (A) | (%) | UFR | PUN | elongation | UFR | PUN | elongation |
|---|---|---|---|---|---|---|---|---|---|---|---|
| Ex. 5 | TMA//-TODI/TDI 100//85/15 | 41000 | 17.0 | 18.2 | 73.5 | 12.3 | 112 | 5.80/35.2 | 12.1 | 108 | 5.65/22.3 |
| Ex. 6 | TMA//-TODI/TDI 100//90/10 | 59000 | 17.0 | 31.4 | 80.8 | 40.4 | 118 | 3.12/10.2 | 38.9 | 105 | 3.37/5.7 |

|   | properties of membrane after γ-ray irradiation(*2) | | | complement consumption (%) |
|---|---|---|---|---|
|   | UFR | PUN | strength/-elongation | |
| Ex. 5 | 12.1 | 112 | 5.78/33.8 | 3 |
| Ex. 6 | — | — | — | 1 |

(*1) Steaming treatment: 121° C. × 20 min
(*2) γ-ray irradiation: 50 KGy (5 mRd)

Table 3 below shows data relating to the variety of permeability with blood of the samples prepared in the above-mentioned examples, cooperative example and reference example.

TABLE 3

|   | Variety of Permeability with Blood | |
|---|---|---|
|   | α | C % |
| Example 1 | 0.31 | 90 |
| Example 2 | 0.51 | 96 |
| Example 3 | 0.25 | 81 |
| Example 4 | 0.16 | 63 |
| Comparative Example 1 | 0.06 | 48 |
| Reference Example 1 | 0.62 | 94 |
| Example 5 | 0.56 | 92 |
| Example 6 | 0.45 | 91 |

As explained in detail in the above, the present invention provides a hollow fiber membrane for blood purification, which has low water permeability and has high urea permeability, which has little complement activation and which is not deteriorated by γ-ray sterilization or steam sterilization.

What we claim is:

1. A membrane for blood purification, which has polyamidimide units of the following general formula (1), which has a mean molecular weight (Mn) of from 10000 to 80000 and which has micropores having a pore radius of from 10 Å to 200 Å:

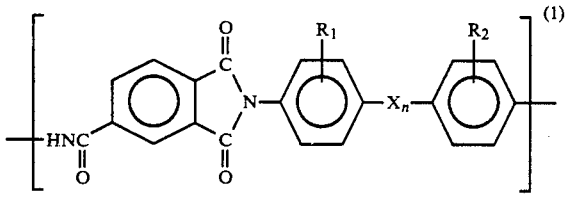
(1)

wherein $R_1$ and $R_2$ each represent a hydrogen atom and/or an alkyl group having from 1 to 4 carbon numbers; X represents a bonding group of O, CO, $SO_2$ or $CR_3.R_4$; $R_3$ and $R_4$ each represent a hydrogen atom or a methyl group; and n represents 0 or 1.

2. The membrane for blood purification as claimed in claim 1, which is obtained by reaction of an acid component containing a trimellitic anhydride of the following formula (2) in an amount of 60 mol% or more to the whole acid component and a diisocyanate component containing an isocyanate compound of the following general formula (3) in an amount of 60 mol% or more to the whole isocyanate components:

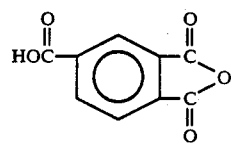
(2)

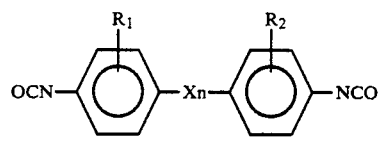
(3)

wherein $R_1$ and $R_2$ each represent a hydrogen atom and/or an alkyl group having from 1 to 4 carbon numbers; X represents a bonding group of O, CO, $SO_2$ or $CR_3.R_4$; $R_3$ and $R_4$ each represent a hydrogen atom or a methyl group; and n represents 0 or 1.

3. The membrane for blood purification as claimed in claim 2, in which the diisocyanate component of the formula (3) comprises bitolylene diisocyanate (Xn=O, $R_1$ and $R_2$ are $CH_3$ in formula (3)) and diphenylmethane diisocyanate (Xn=$CH_2$, $R_1$ and $R_2$ are H in formula (3)) in a molar ratio of bitolylene diisocyanate/diphenylmethane diisocyanate being from 100/0 to 60/40.

4. The membrane for blood purification as claimed in claim 2, in which the diisocyanate component contains at most 30 mol% of tolylene diisocyanate to the diisocyanate component of the formula (3).

5. The membrane for blood purification as claimed in claim 1 or 2, which has a porosity of the micropores having a pore radius of from 10 Å to 200 Å of being from 70 to 90%.

6. The membrane for blood purification as claimed in claim 1 or 2, which has a ratio (α value) of the water permeation rate with blood to that with pure water of being 0.1 or more, preferably 0.2 or more, and has a percentage (C value) of the water permeation rate after dialysis of blood with it for 60 minutes to that after dialysis of blood with it for 15 minutes being 50% or more, preferably 70% or more.

7. The membrane for blood purification as claimed in claim 1 or 2, which has a variation of the water permeability being 40% or less before and after steaming treatment of it at 121° C. for 20 minutes.

8. The membrane for blood purification as claimed in anyone of claims 1 to 8, which is a hollow fiber membrane.

* * * * *